US008999445B2

(12) United States Patent
Henze et al.

(10) Patent No.: US 8,999,445 B2
(45) Date of Patent: Apr. 7, 2015

(54) GLASS OR GLASS-CERAMIC COMPOSITE MATERIAL AND METHOD FOR PRODUCING SAME (75) Inventors: Inka Henze, Nieder-Olm (DE); Stefan Spengler, Budenheim (DE); Matthias Bockmeyer, Mainz (DE); Eveline Rudigier-Voigt, Mainz (DE); Tamara Sweeck, Bad Muenster (DE); Oliver Gros, Rheinboellen (DE)

(73) Assignee: Schott AG, Mainz (DE)

( * ) Notice: Subject to any disclaimer, the term of this patent is extended or adjusted under 35 U.S.C. 154(b) by 211 days.

(21) Appl. No.: 13/522,052

(22) PCT Filed: Jan. 14, 2011

(86) PCT No.: PCT/EP2011/000140
§ 371 (c)(1),
(2), (4) Date: Mar. 4, 2013

(87) PCT Pub. No.: WO2011/085995
PCT Pub. Date: Jul. 21, 2011

(65) Prior Publication Data
US 2013/0183487 A1  Jul. 18, 2013

(30) Foreign Application Priority Data
Jan. 14, 2010 (DE) .......... 10 2010 004 741

(51) Int. Cl.
*B05D 1/36* (2006.01)
*B05D 3/12* (2006.01)
(Continued)

(52) U.S. Cl.
CPC .......... *C03C 17/3636* (2013.01); *C03C 1/008* (2013.01); *C03C 17/3607* (2013.01); *C03C 17/3649* (2013.01); *C03C 17/3684* (2013.01); *C03C 17/3686* (2013.01); *C03C 2217/45* (2013.01); *C03C 2217/465* (2013.01); *C03C 2217/478* (2013.01); *C03C 2217/485* (2013.01); *C03C 2217/77* (2013.01)

(58) Field of Classification Search
USPC .......... 427/261, 264, 266, 277, 287
See application file for complete search history.

(56) References Cited

U.S. PATENT DOCUMENTS 5,766,680 A  6/1998  Schmidt et al.
6,463,760 B1 *  10/2002  Fink-Straube et al. ........ 65/17.2
(Continued)

FOREIGN PATENT DOCUMENTS

DE  4130550  3/1993
DE  202004015925  11/2005
(Continued)

OTHER PUBLICATIONS

English Translation of International Preliminary Report on Patentability dated Aug. 7, 2012 corresponding to International Patent Application No. PCT/EP2011/000140.
(Continued)

*Primary Examiner* — Frederick Parker
(74) *Attorney, Agent, or Firm* — Ohlandt, Greeley, Ruggiero & Perle, LLP (57) ABSTRACT A method for producing a glass or glass ceramic composite material with a metallic decorative appearance is provided. The method includes: applying a layer onto a glass or glass ceramic substrate, the layer comprising a sol-gel and/or a polysiloxane; patterning the layer; and applying a metallic-looking layer onto the patterned layer.

13 Claims, 3 Drawing Sheets (51) Int. Cl.
  *C03C 17/36* (2006.01)
  *C03C 1/00* (2006.01)

(56) References Cited

U.S. PATENT DOCUMENTS

| | | |
|---|---|---|
| 6,866,883 B2 | 3/2005 | Wang et al. |
| 2004/0038081 A1* | 2/2004 | Wang et al. ............. 428/694 SG |
| 2004/0191575 A1* | 9/2004 | Kurataka et al. ........ 428/694 ST |
| 2006/0292345 A1 | 12/2006 | Dave et al. |
| 2007/0228033 A1* | 10/2007 | Lee et al. ..................... 219/543 |
| 2008/0193721 A1 | 8/2008 | Ukelis et al. |
| 2010/0177384 A1* | 7/2010 | Peroz et al. .................. 359/487 |

FOREIGN PATENT DOCUMENTS

| | | |
|---|---|---|
| DE | 102004040043 | 3/2006 |
| DE | 102004049111 | 4/2006 |
| EP | 1016637 | 7/2000 |
| EP | 1174258 | 1/2002 |
| FR | 2914630 | 10/2008 |
| JP | 2679454 | 11/1997 |
| WO | 99/06873 | 2/1999 |
| WO | 00/10929 | 3/2000 |

OTHER PUBLICATIONS

International Search Report dated Jun. 29, 2011 corresponding to International Patent Application No. PCT/EP2011/000140.

Krug, H., et al., "Fine patterning of thin sol-gel films;" Journal of Non-Crystalline Solids 147 & 148, North-Holland, 1992, pp. 447-450.

English Translation of Written Opinion of the International Searching Authority dated Jun. 29, 2011 corresponding to International Patent Application No. PCT/EP2011/000140, 7 pages.

\* cited by examiner

GLASS OR GLASS-CERAMIC COMPOSITE MATERIAL AND METHOD FOR PRODUCING SAME

FIELD OF THE INVENTION

The invention relates to a decorative composite material and to a method for producing such a material, in particular the invention relates to the manufacturing of a glass or glass ceramic composite material. More specifically, the invention relates to a composite material with an appearance of brushed stainless steel.

BACKGROUND OF THE INVENTION

Glass elements which have, at least in sections thereof, an appearance of steel, especially stainless steel, are known. Such glass elements are used, for example, in the kitchen area, especially for ovens, or for architectural glazing such as doors. For example, a transparent glass or glass ceramic sheet may be provided with a surface of metallic appearance in an edge region thereof, so creating the impression that the sheet is framed by metal.

To achieve such a metallic appearance it is known from actual practice, for example, to laminate a metal foil or a foil having a metallic appearance onto the surface.

This foil is usually textured and may thus provide an appearance similar to that of brushed stainless steel. If applied to a front face, i.e. the face with which the user comes into contact, such a foil is easily damaged mechanically or detaches from the glass substrate.

When applied to the rear face, although not being subjected to excessive mechanical stress, however, such a composite is prone to delamination, due to the high humidity prevailing in the kitchen and especially with cooking equipment. Frameless composites often exhibit delamination effects starting from the edges.

Also known in the art are decoratively textured laminates produced by multiple printing similar to the manufacturing of a decorative texture of laminate flooring. In this case a texture is obtained by differently colored decorative printing. Achieving such a visual impression is complex, and is limited to a viewed face. Moreover, it is extremely complicated by means of a conventional printing method to apply a textured coating which has a metallic appearance.

OBJECT OF THE INVENTION

An object of the invention therefore is to provide a method which permits to produce a substrate, in particular a glass or glass ceramic substrate that has a decorative, textured coating.

In particular it is intended to provide a substrate having an appearance of satin stainless steel.

DESCRIPTION OF THE INVENTION

This object of the invention is already achieved by a method for producing a composite material and by a composite material according to any of the independent claims.

Preferred embodiments and refinements of the invention are described in the respective dependent claims.

The invention relates to a method for manufacturing a decorative composite material, in particular a glass or glass ceramic composite material having two layers arranged one above the other, at least in sections thereof.

According to the method, a sol-gel layer is applied onto a substrate, preferably a transparent substrate. Besides a glass or glass ceramic substrate which is preferably used, a plastic substrate, in particular a transparent plastic substrate may be used as well, for example.

Sol-gel layers are defined as inorganic layers produced in a sol-gel process, or hybrid polymer layers which in addition to the inorganic components also comprise organic networks or organic additives. Optionally, polysiloxanes may be added to the sol-gel layer. The synthesis of such layer materials is known in the art.

According to the invention, the sol-gel layer is patterned. Patterning, in the context of the invention, means producing a three-dimensionally designed surface, i.e. a surface which is not smooth.

Then, a layer which comprises at least one metal is applied onto the patterned sol-gel layer, which layer produces a decorative appearance.

In the context of the invention, a metal-comprising layer is defined as a metallic layer or a layer which, at least in portions thereof, comprises a metal or metallic-looking components, or a layer having a metallic appearance due to a pigmentation, in particular a decorative or lacquer system, or optical multi-layer systems which by virtue of individual layers of different optical properties exhibit reflective and/or color properties.

It is also possible to use a luster color. Such color usually comprises dissolved metal resinates which form, at higher temperatures, a thin metal oxide layer with a colored or metallic appearance.

Moreover, it is possible to use a lacquer which includes metal or metal oxide particles.

The inventors have found that a patterned sol-gel layer permits to provide a surface profile which may have a texture like that of brushed metal, and which serves as a substrate for a metal-comprising layer that allows to obtain a metallic appearance. Similar as with laminated foils for example, the employed method allows to ensure that the provided articles have identical textures. Generally, it is possible to realize patterns smaller than 100 nm.

Sol-gel layers due to their inorganic, reactive components usually bond significantly better, in particular chemically, to glass or glass-ceramic surfaces than it is the case for example with laminated foils or thick lacquer coatings.

The composite material produced according to the invention is therefore distinguished by a high mechanical resistance and by its simplicity of manufacture.

The sol-gel materials as defined above may be applied by techniques known in the art, e.g. liquid-phase coating processes such as dipping, spraying, spin coating, pad printing, inkjet, roller coating, slot casting, screen printing, DoD (drop-on-demand) printing, etc. Particularly preferred are processes which selectively allow the substrate to be coated over the entire surface or in sections thereof.

In one particular embodiment of the invention, the patterned layer may be applied using a transfer technique.

In one particular embodiment of the invention, the sol-gel layer is precured before patterning, especially thermally or by a photochemical process.

By definition, patterning of the sol-gel layers is performed using an embossing process.

Precuring of the layer may serve, for example, to increase the viscosity thereof, so that embossed patterns do not even out but rather are better transferred into the layer. However, it is also contemplated to cure the layer, in particular thermally and/or photochemically, while it is contacted by an embossing tool by means of which the pattern is transferred into the layer.

To produce the embossing tool which is also referred to as an embossing stamp below, first a master is required, which has the desired pattern. Such a master may be produced for example by lithographic processes, or may simply constitute a workpiece having a surface texture. This master is then covered with a polymer mass and is so molded. In one particular embodiment, a piece of metal with a brushed stainless steel surface is used to manufacture the embossing stamp. The desired patterns may also be transferred from any other kinds of substrates such as wood, plastics, glass, ceramics, metal, cloth, etc.

In particular, a silicone molding compound may be used which is poured onto a template and cured. Curing may be accomplished thermally. However, as is known in the art, silicone molding compounds may also cure at room temperature over extended periods. In order to reduce blistering, one embodiment of the invention suggests to work under vacuum. Typical negative pressures are below 1 bar, in particular in a range from $0.9*10^{-1}$ to $1*10^{-2}$ bars.

The cured embossing stamps of polymer material can be released from the template and are now ready to be used as an embossing stamp. An advantage of such polymer embossing stamps is to be reusable after having been cleaned thoroughly, e.g. using an alcohol or an alcoholic bath or an alkaline cleaning agent.

In another embodiment, such embossing stamps may be produced by embossing a master pattern into a lacquer which had previously been applied to a transparent foil. This embossing foil, which is in particular transparent to UV light, preferably comprises such materials as PMMA or polyacrylates.

Next, in one preferred embodiment of the invention, the embossing stamp, which for example may be designed as a roller by attaching the released master on a roller, is pressed onto the sol-gel layer, and simultaneously the sol-gel layer is precured so that it will remain dimensionally stable and maintain the embossed patterns.

In an alternative embodiment no pressure is required, since the sol is automatically drawn into the pattern of the stamp. The sol is drawn into the pattern by capillary forces and by the own weight of the stamp.

This is also due to the specific viscosity and high plasticity of the lacquer. The lacquers exhibit a low thixotropy which promotes the process of 'automatically being drawn into the pattern'. Furthermore, the lacquers exhibit a rather Newtonian behavior which means that the shear stress is proportionally related to the shear rate.

Typical viscosities of the employed lacquers are from 50 mPas to 2500 mPas, preferably from 75 mPas to 500 mPas, more preferably from 100 mPas to 300 mPas. All values were determined at a shear stress of 85 N/m$^2$.

In one particular embodiment, the embossing stamp is placed on the layer to be embossed starting from one side and is rolled onto the layer, optionally with pressure, similar to a lamination process. The composite of substrate/sol-gel layer/embossing stamp is then precured, and then the stamp is removed.

Precuring may be accomplished, for example, by adding a photoinitiator and using UV light. Alternatively or in combination thermal curing is possible.

After the embossing stamp has been removed, the resultant embossed sol-gel layer may again be thermally cured.

In a preferred embodiment of the invention, a metal layer is deposited as the metal-comprising layer, in particular using a PVD or CVD process. Such deposition processes allow to provide very thin and therefore well adhering layers.

At the same time, such deposition processes largely avoid or at least reduce the tendency of the layer to fill valleys of the pattern with material.

Deposition may, for example, be performed using a sputtering process. Such a sputtering process especially allows to transfer alloys from a target onto the composite material while substantially maintaining the composition of the alloy.

In another embodiment, a multilayer optical layer system is deposited instead of the metal layer. This layer system is designed such that reflective, mirror-like properties and/or color effects can be achieved.

By definition, the metal-comprising layer comprises metals, such as chromium, iron, silver, gold, aluminum, molybdenum, tungsten, copper, cobalt, zinc, manganese, nickel, bismuth, rhodium, platinum, metal alloys such as high-grade steels, bronze, semi-metals such as silicon, or oxide or carbide or nitride metals or semi-metals.

According to the invention, mixtures are possible both within one layer and among multiple layers.

It will be appreciated that a 'metal layer' is not to be understood as a layer which only consists of metal, rather the metal layer may comprise non-metallic additives.

Alternatively, however, it is likewise conceivable to apply a lacquer onto the patterned sol-gel layer, which lacquer comprises metallic and/or semi-metallic and/or metal-oxide, metal-carbide and/or metal-nitride and/or fluoride particles and/or particles comprising graphite, BN, and thus has a metallic appearance.

Preferably, nanoparticles having a size of 0.1-100 nm are used.

In a refinement of the invention, particles, in particular nanoparticles, are added to the sol used for the sol-gel layer. For example, oxide particles of metal or semi-metal oxides may be added. In a preferred embodiment of the invention, the particles have a size between 0.05 and 100 nm, preferably from 1 to 80 nm. Particles that may be used are both amorphous as well as crystalline particles, and the particles shape is not limited, both spherical and irregularly shaped particles may be used.

In one particular embodiment of the invention, fibrous nanoparticles are used for the sol-gel layer.

On the one hand, by virtue of the particles added, a better dimensional stability of the sol-gel layer is obtained during and following the embossing process. Due to the size of the particles, transparency of the sol-gel layer is ensured.

On the other hand, preferably, a high amount of particles is used, so that the sol is ultimately used as an adhesive which connects the individual particles.

In particular, the volume fraction of particles to the precursor of the sol is between 0.1 and 0.9, preferably from 0.5 to 0.8. Thus, a layer might be applied which predominantly comprises particles. This reduces the risk of crack formation during shrinkage of the sol and allows to apply layers of a sufficient thickness to form a pattern therein. In particular, layers having a thickness between 50 nm and 1 mm, preferably from 100 nm to 100 μm, more preferably from 150 nm to 10 μm may be applied.

In a refinement of the invention, the sol-gel layer is preferably thermally cured before applying the metal-comprising layer, in particular at 50 to 1000° C., preferably at 100 to 800° C., and more preferably at 450 to 740° C.

In particular, it is intended to perform thermal curing at temperatures at which most of the organic constituents of the sol are removed. Then a predominantly inorganic layer remains, which is very resistant, both mechanically and thermally.

In one embodiment, the organic content is less than 5 wt %, preferably less than 1 wt %, more preferably less than 0.1 wt %.

In another embodiment, the embossed sol-gel layer includes high-temperature resistant organic residuals, such as methyl or phenylsilane groups.

In one embodiment of the invention, the employed sol-gel layers are temperature-resistant to such an extent that a glass or glass-ceramic substrate with a sol-gel layer already applied may be tempered. In this case, for example, thermal curing of the sol-gel layer may be accomplished during a tempering process, so that the potentially additional manufacturing step for thermal curing is eliminated.

In one embodiment, the employed sol-gel layers are designed such that they exhibit a temperature resistance of at least 250° C., preferably at least 400° C., more preferably at least 600° C., most preferably at least 800° C.

In a refinement of the invention, the sol-gel layer is printed onto the substrate, in particular using a screen printing technique.

In particular it is suggested to print onto sections of the substrate surface and to exclude at least one area of the surface.

An advantage of this embodiment of the invention is that areas which are not intended to be provided with a decorative appearance do not need to be coated with the sol-gel layer, so that complex inspections of the surface are eliminated in these areas.

In order to provide a screen printable lacquer coating system, sol-gel precursors having a low solvent content are preferred, in particular solvents are used which have a low vapor pressure of less than 2 bars.

Instead of a highly volatile alcohol, a different solvent may be used, in particular ethylene monoethyl ether and/or terpineol and/or diethylene glycol monoethyl ether and/or tripropylene glycol monomethyl ether.

When using a printing technique, it is also conceivable to provide a pattern only in sections of the substrate, but the embossing stamp or roller also contacts areas in which no pattern is provided because there is no sol-gel layer in this area. So, for example, the entire glass substrate may be passed in-line underneath a roller.

In one particular embodiment, the embossing stamp may be designed such that it has at least two different patterns.

In another embodiment, the embossing tool may be a foil, which is in particular transparent to UV light and preferably comprises such materials as PMMA or polyacrylates.

The invention moreover relates to a composite material which in particular is producible or is produced using the method described above.

The composite material comprises a preferably transparent substrate, in particular a glass or glass ceramic substrate.

A layer preferably produced by a sol-gel process is disposed on the substrate, which layer is at least partially of inorganic composition.

The preferably inorganic layer is patterned, i.e. it has a three-dimensional pattern, and a metal-comprising layer is disposed on the inorganic layer.

In one particular embodiment, the metal-comprising layer may be coated by further layers, such as an oxide layer, a silicone paint, a ceramic paint, an anti-scratch layer, or a combination of such layers. It is also conceivable to apply anti-reflective layers or barrier layers which, for example, prevent oxidation of the metal-comprising layer at higher temperatures.

The inorganic layer which in particular comprises metal oxides and/or semi-metal oxides, permits to produce a good, in particular a chemical bond, in particular to a glass or glass ceramic substrate.

The metal-comprising layer disposed thereon may be thin, since its only purpose is to be decorative and since it has no other functions apart from providing a visual effect. These layers may be semi-transparent or opaque.

The patterned layer, on the other hand, may have a high depth of the pattern, in particular the pattern depth may be from 0.5 nm to 1 mm, preferably from 5 nm to 10 µm, most preferably between 50 nm and 4 µm.

The patterned layer is therefore suitable to support nearly any types of patterns. In particular, the formed layer may have a texture of a brushed metal.

In another embodiment of the invention the preferably inorganic layer has a thickness from 0.05 to 10 µm.

The metal-comprising layer may be thin, in particular it has a thickness from 10 nm to 30 µm, preferably from 50 nm to 1 µm, and more preferably from 100 nm to 800 nm. This is preferably achieved with metallic layers or multi-layer systems.

In another embodiment, the decorative layer is formed using lacquers. The lacquers may include metallic-looking pigments or may reactively produce metal layers.

Metallic-looking pigments are particles which reflect the light. Preferably included are noble metals such as gold, silver, rhodium, platinum, iridium; metals such as zinc, iron, nickel, manganese, chromium, copper; reflective pigments which contain aluminum, mica, or effect pigments (e.g. from Merck company), iriodines, or graphite.

In another embodiment, the metallic-looking layer is produced using ceramic colors. Ceramic colors are known in the art and include, e.g., solvents, fluxing agents, and pigments.

In a refinement of the invention, the refractive index of the sol-gel layer is adapted to the refractive index of the substrate, in particular the glass or glass ceramic substrate, and differs by less than 0.3, preferably by less than 0.2.

The composite material according to the invention may be exposed to the viewer in two ways.

In one embodiment, the layer system is disposed behind the substrate, i.e. for example in a kitchen appliance it is not provided on the front side of the substrate, but on the side of the substrate facing away from the viewer.

This embodiment of the invention produces an unusual appearance, since the impression is that the metal-comprising layer is patterned and not the glass. For example, an impression of a stainless steel plate coated with glass may be created.

Also, an impression of a black brushed metal surface may be obtained.

For this purpose the substrate should be transparent, and the refractive index of the sol-gel layer should differ from the refractive index of the substrate by less than 0.3.

An advantage of this embodiment with a metal-comprising layer on the rear face is that the pattern is protected from mechanical contacts. So, lower requirements have to be imposed on the mechanical properties. Moreover, metallic looking thick layers are an option, for example layers comprising a lacquer, because the layer may fill the texture of the sol-gel layer without impairing the visual appearance of the pattern. Furthermore, additional layers may be applied to the metallic-looking layer, such as diffusion barriers, ceramic or silicone-based colors.

In another embodiment, the layer system is disposed on the front side of the substrate. In this arrangement, besides the specific visual characteristic, the haptic property may be of importance, for example that of brushed stainless steel. This arrangement likewise allows to apply additional layers such as anti-scratch layer, diffusion barriers, AR layers or the like onto the metallic-looking layer.

In this case, a thin decorative layer should be provided which follows the pattern of the sol-gel layer and does not fill it.

Preferably, in this embodiment of the invention, a transparent protective layer which serves to enhance mechanical and/or chemical resistance is applied onto the decorative layer.

This embodiment of the invention permits to mimic the appearance of a variety of different decorative structures. The visual appearance of the layer is not impaired by the reflecting surface of the substrate or by its color.

In one embodiment, the layer system is designed such that the first layer comprises an embossed sol-gel layer having a texture of brushed stainless steel and the second layer is a decorative metallic layer. Preferably, a thermally stable high-grade steel is used.

In all of the above embodiments, the surface of the substrate may be pretreated. A pretreatment, in this context, is defined as a cleaning treatment, surface activation treatment, treatment with adhesion promoters or adhesion promoting layers.

DESCRIPTION OF THE DRAWINGS

The invention will now be described in more detail with reference to the drawings of FIGS. 1 to 6.

Referring to FIGS. 1 to 4, manufacturing of a composite material according to the invention will be explained in more detail, the figures schematically illustrating the manufacturing steps.

Figure 1:
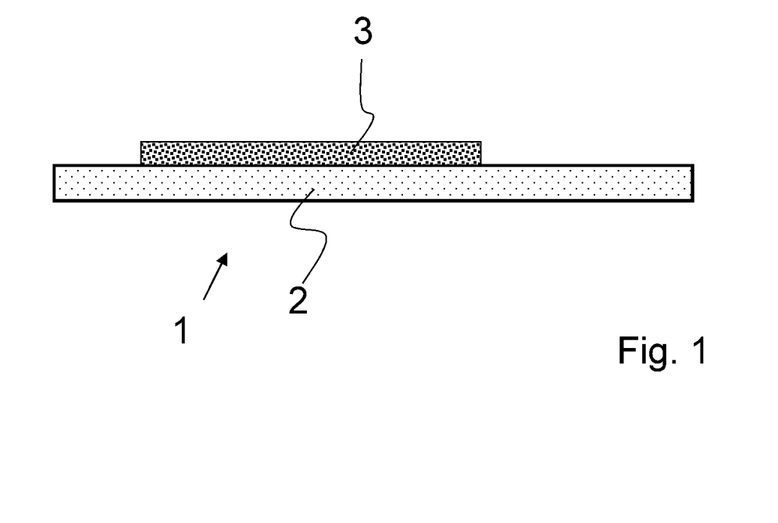

FIG. 1 shows a composite material 1 comprising a substrate 2 onto which a sol-gel layer 3 is applied at a section thereof.

Figure 2:
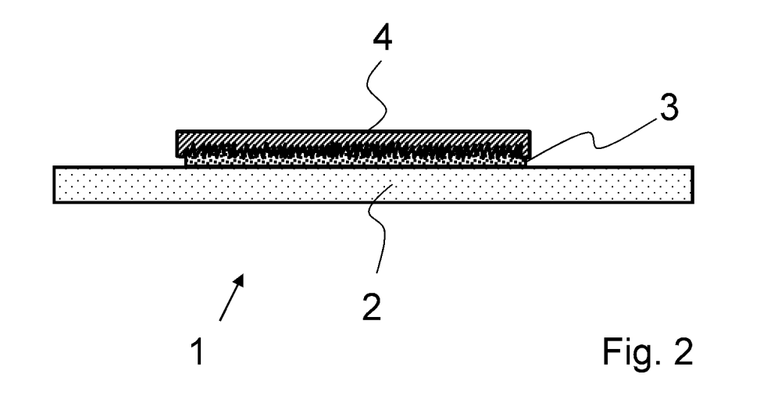

As shown in FIG. 2, the sol-gel layer 3 is patterned using an embossing tool 4 which is pressed onto the layer.

Figure 3:
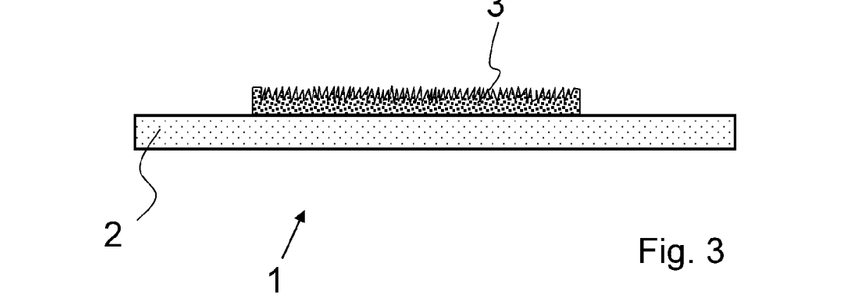

The patterned sol-gel layer 3 is shown in FIG. 3. Preferably, the pattern is similar to the texture of a brushed stainless steel surface.

Figure 4:
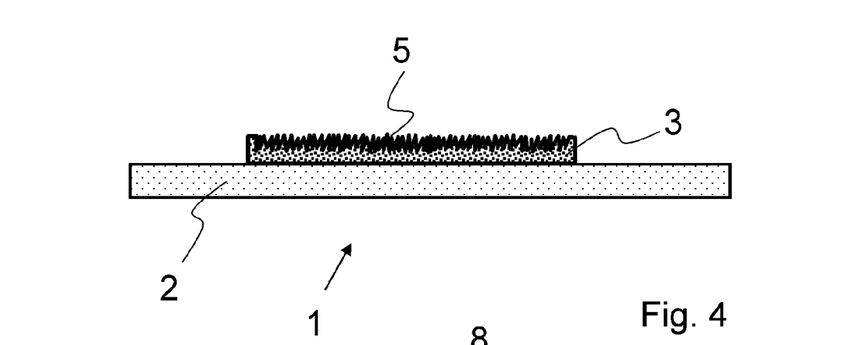

Then, as shown in FIG. 4, a metal layer 5 is applied to the patterned sol-gel layer 3 using a sputtering process, and the result is a coating with a metallic appearance.

An embossing stamp may be used as the embossing tool, for example.

The sol-gel layer may be applied, for example, by liquid coating onto a glass or glass ceramic substrate. Preferably the sol-gel layer comprises amorphous and/or hybrid and/or crystalline particles. Through the particles and the sol, an adaptation of the refractive index of the layer to the substrate 2 or to additional overlying layers (not shown) may be provided.

Preferably, the sol-gel layer 3 is applied using a screen printing process. In this way, areas which are not to be patterned may be excluded, and free areas which are for example required for a display or control panel are not provided with the sol-gel layer, and a sophisticated inspection for layer roughnesses, inhomogeneities, and/or contaminations may be dispensed with in these areas.

In one embodiment of the invention, the sol-gel layer 3 is precured, in particular using a photochemical process.

The embossing tool 4 is preferably formed as an embossing stamp, which is continuously pressed onto the sol-gel layer with a predefined pressure, in particular in form of a roller or a planar embossing stamp. In one embodiment of the invention, the sol-gel layer 3 is cured during embossing, in particular thermally or photochemically. Especially when a relatively low-viscosity sol is used, there is no need to apply the embossing stamp with particularly great force, rather the sol is drawn into the pattern of the embossing stamp almost automatically. If bubbles form between the embossing stamp and the sol, they may be removed using a roller, or by vacuum.

As a pattern, which is in particular understood as a three-dimensional surface profile, both periodic and random patterns may be used, in particular lines, brushed surfaces, light-scattering layers, etched surfaces, textures that serve to provide enhanced haptics, and simple geometric shapes such as pyramids, inverted pyramids, cubes, spheres, etc.

In one particular embodiment, the patterned sol-gel layer defines the texture of subsequently deposited layers, in particular that of the metal-comprising layers deposited according to the invention, and optionally also that of subsequent layers.

The patterned sol-gel layer 3 provided with a metal layer 5 is cured at temperatures from 50 to 1000° C., preferably from 100 to 800° C., depending, inter alia, on the required temperature resistance of the final product.

The pattern is maintained, even if organic components of the sol-gel layer are completely burned out.

The depth of the pattern decreases by 0 to 60% as compared to the pattern of the embossing tool, depending on the temperature and the sol-gel used which in particular includes particles. If necessary, this may be compensated for by using an embossing tool which has a greater pattern depth than the pattern depth that is actually desired.

Sol-gel precursors that may be used are in particular hydrolyzed and condensed epoxy- or methacrylate-functionalized alkoxysilanes. When filled with nanoparticles, in particular $SiO_2$ nanoparticles, which in particular are added as an alcoholic dispersion, shrinking below 25% may be achieved.

Preferred particles are substantially fiber-shaped particles, more preferably $SiO_2$ particles having a diameter from 5 to 15 nm and a length from 5 to 150 nm. In other embodiments, mixtures of substantially spherical particles of different sizes ranging from 5 nm to 125 nm may be used.

The metallic looking layer 5 may, for example, be applied using a deposition process such as liquid phase coating, CVD, or PVD, or may be applied as a metallic lacquer. Preferably, the metal layer 5 is applied using a sputtering process. The metal layers deposited in a vacuum process may be applied either on the entire surface or only in sections thereof. For this purpose uncoated areas are masked in the sputtering process, for example using a resist or a shield. Metallic-looking lacquers usually comprise acrylic resins which include metallic pigments, or ceramic paints which in addition to the coloring components include fluxing agents. Such lacquers or lacquer systems are preferably applied by screen printing.

In one embodiment according to the invention, this lacquer layer may comprise luster colors such as described, e.g., in US 2007/0056961 or in DE 102008020895.

Also, it is in particular conceivable to apply the metal layer also to non-patterned areas so as to produce a reflective, glossy surface there.

The composite material according to the invention is in particular intended to be used for cooker extraction hoods, control panels, oven doors, steam cookers, microwave ovens, kitchen fronts, as splash guards in kitchens, for glass elements in small electrical appliances, especially in toasters, as a cooktop, fireplace viewing panel, but also for architectural applications, picture framing, elevators, structural glazing, partition walls, doors, flooring, furniture, and consumer electronics such as computers, mobile phones, monitors, and in the automotive sector or aviation sector, for example for decorative applications in the interior of the vehicles such as the instrument panel, etc.

A preferred layer material for the sol-gel layer is amorphous or hybrid polymeric $SiO_2$, optionally with fractions of amorphous and/or nanocrystalline metal or mixed metal oxides, such as $TiO_2$, $ZrO_2$, 8YSZ, $Al_2O_3$, $CeO_2$, ZnO, ITO, or hybrid polymeric derivatives thereof.

In one particular embodiment, non-oxide and/or partially oxide nanoparticles may be used, such as $MgF_2$, $CaF_2$, $Mg_2OF_2$, SiC, SiOC, SiN, SiON.

In one embodiment, the coating solution is based on amorphous or crystalline molecularly or colloidally dispersed or hybrid polymeric sol-gel precursors of silicon, titanium, zirconium, aluminum, zinc, magnesium, calcium and/or tin, in particular SiORxRy TiORxYy, ZrORxXy, AlORxYx, ZnORxYy, MgORxXy, CaORxXy, and/or SnORxX.

A UV-curable hybrid polymer that may be used is a hydrolyzed and condensed alkoxysilane precursor having one or more UV-crosslinkable organic functional groups, in particular glycidyloxypropyltriethoxysilane, or methacryloxypropyloxytrimethoxysilane.

This precursor is used as a binder for nanoparticles, in particular oxide nanoparticles, especially $SiO_2$ nanoparticles.

Preferably, nanoparticles are used which are connected with a binding agent that has a degree of condensation of more than 60%. The volume fraction of the nanoparticles is preferably greater than 30%, more preferably greater than 50%.

One particular embodiment uses a two-component system. One component thereof is the hydrolyzed organically functionalized silane, for example a solvent-reduced hydrolyzate of tetraalkoxysilane and glycidylpropyltrialkoxysilane. Another, second component comprises the metal oxide and/or semi-metal oxide nanoparticles with a photoinitiator in a high-boiling solvent.

Before use, the two components are mixed in an appropriate ratio and can then be used for more than 24 h.

The thermally cured sol-gel layer which is especially cured at a temperature of more than 200° C. is microporous or mesoporous and exhibits an open porosity from 1 to 50%. If thermally treated at an even higher temperature, for example at 500° C., the layer is mesoporous with a pore diameter from 2 to 10 nm.

The layers according to the invention at the same time provide a barrier effect to diffusion. The barrier effect may be further enhanced by applying an additional layer, such as $SiO_2$ or $Si_xN_y$, by a deposition process known in the art. Besides screen printing, pad printing, dip coating, roll coating, flow coating, spraying, or other liquid coating techniques may be used to apply sol-gel layer 3. In a first embodiment of the invention, the first curing step during the embossing process is accomplished thermally in a temperature range from 50 to 150° C. In another embodiment, curing during the embossing process is effected using UV light.

Final curing or firing of the first, texture-defining layer is performed in a temperature range from 50 to 1000° C., preferably from 450 to 740° C.

The embossing tool is preferably applied with a contact pressure from 0.1 to 5 bars. It has been found to be particularly advantageous to apply the embossing tool by rolling, starting from one side. Embossing may be performed under vacuum to reduce the risk of blistering.

Compounds having a dewetting or wetting effect may be added to the liquid coating solution.

For example, before coating the substrate the latter may be pretreated by a primer to achieve better adhesion of the sol-gel layer.

Figure 5:
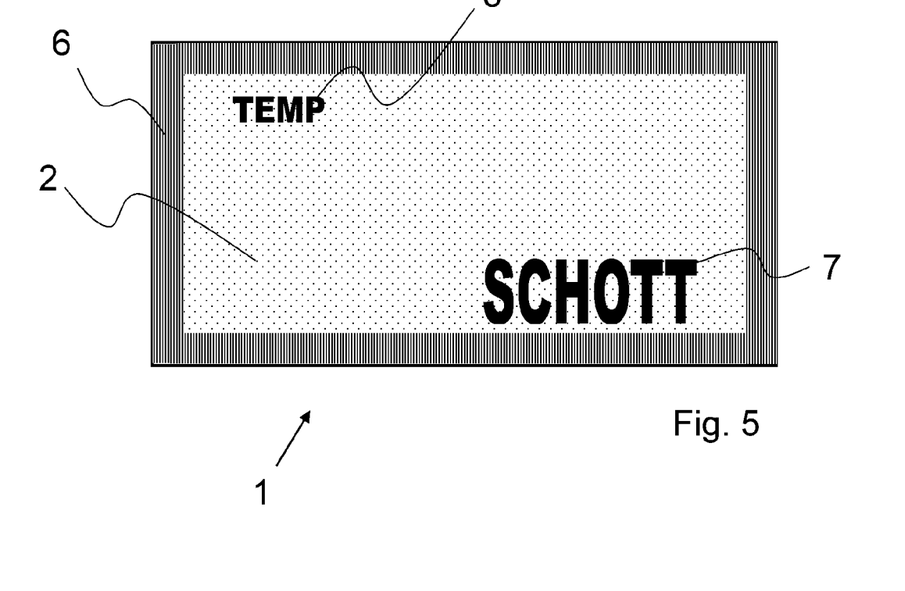

FIG. 5 shows a composite material 1 in a plan view.

A patterned layer with a metallic appearance is applied on a glass substrate 2 as a framing 6.

Also, a label 7 as an indication of origin, or a part of a temperature display 8 can be applied.

Figure 6:
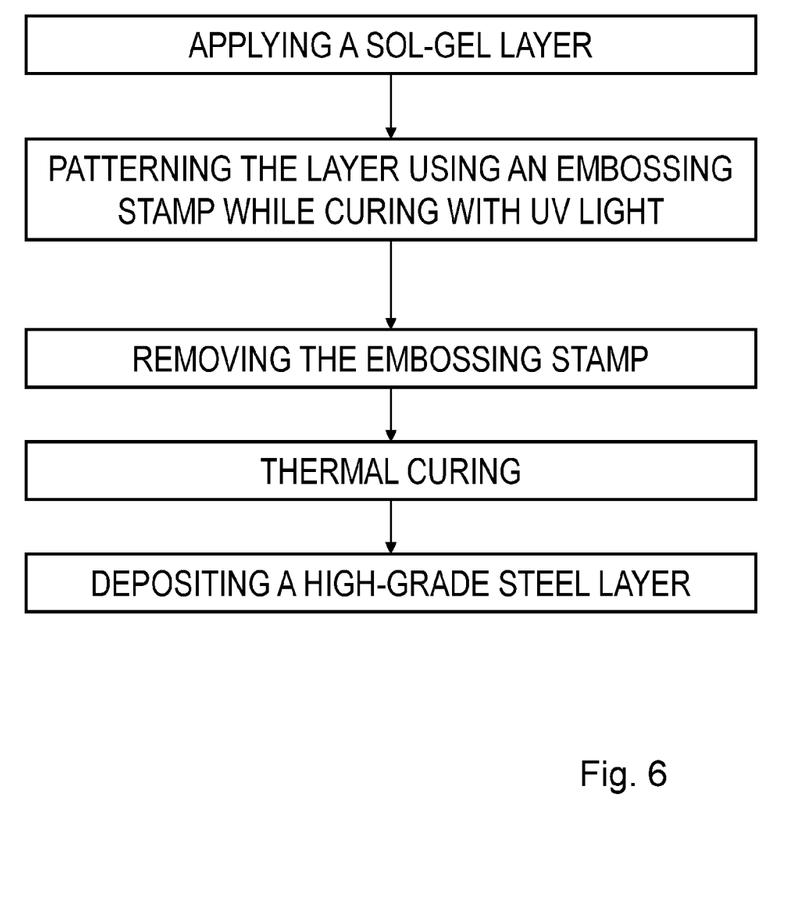

FIG. 6 shows a schematic flow chart of the essential method steps.

First, a sol-gel layer is applied. The applied sol-gel layer is patterned using an embossing stamp and is simultaneously cured using UV light. Then, the embossing stamp is removed, and subsequently the composite material is thermally cured.

Finally, a high-grade steel layer is applied by a sputtering process. If desired, additional layers may be applied.

In detail, a composite material according to the invention may be produced as follows, for example:

Example 1

In a vessel, GPTES (glycidyloxypropyltriethoxysilane) is provided with TEOS (tetraethoxysilane), and is hydrolyzed with water in which PTSA (p-toluenesulfonic acid) had been dissolved. For example, 0.08 mol of GPTES, 0.02 mol of TEOS, 2.3 g of water, and 0.344 g of PTSA may be used.

After stirring, an alcoholic dispersion of irregularly shaped $SiO_2$ nanoparticles in isopropanol is added to this hydrolyzate. For example, 110 g of a dispersion may be used with a fraction of particles of 15%.

The nanoparticles may for example have a fibrous shape, with a diameter from 5 to 15 nm and a length from 30 to 150 nm.

Ethylene glycol monoethyl ether (e.g. 13 g) is added to this solution, and the highly volatile solvent is removed in a rotary evaporator (e.g. at 100 mbar and 50° C. bath temperature).

Then, a photoinitiator is added to the resulting embossing sol (e.g. 0.6 g of the cationic photoinitiator Irgacure 250 in 1 g of ethylene glycol monoethyl ether).

This lacquer system allows to apply layers to one side of a soda lime glass by screen printing. For screen printing a 180 mesh may be used, for example.

After the solvent had been dried off between room temperature and 50° C. with or without air circulation, a patterned embossing stamp is applied, in particular a silicone embossing stamp (polydimethylsiloxane), and then the layer is cured through the UV transparent embossing stamp using a UV lamp.

When the embossing stamp is removed the pattern of the embossing stamp had been transferred into the nanoparticle-functionalized coating.

The layers may now be cured thermally at temperatures from 100 to 800° C.

A preferred heating rate is 3 K/min, with a holding time of 1 h at 500° C. The final thickness of the layer is preferably from 2.5 to 3 μm.

Then, a high-grade steel layer is applied by a sputtering process in a thickness of at least 100 nm.

Example 2

In a vessel, 16.7 g (0.06 mol) of GPTES (glycidyloxypropyltriethoxysilane) is provided with 4.1 g (0.02 mol) of TEOS (tetraethoxysilane) and 3.56 g (0.02 mol) of MTEOS (methyltriethoxysilane), and is hydrolyzed with 2.3 g of water in which 0.344 g of PTSA (p-toluenesulfonic acid) had been dissolved.

After having been stirred for 2 min, a mixture of 44 g of a 30 mass-% alcoholic dispersion of spherically shaped $SiO_2$ nanoparticles with a diameter from 40 to 50 nm in isopropanol and 11 g of an alcoholic dispersion of spherical $SiO_2$ nanoparticles with a diameter from 10 to 15 nm is added to this hydrolyzate.

16 g of ethylene glycol monoethyl ether is added to this solution, and the highly volatile solvent is removed in a rotary evaporator at 100 mbar and 50° C. bath temperature.

Then, 0.6 g of the cationic photoinitiator Irgacure 250 in 1 g of ethylene glycol monoethyl ether is added to the embossing sol.

This lacquer system allows to apply layers to one side of a soda lime glass by screen printing using a 180 mesh.

After the solvent had been dried off between room temperature and 50° C. with or without air circulation, a patterned silicone embossing stamp (PDMS) is applied, and then curing is accomplished through the embossing stamp using a UV lamp. When the embossing stamp is removed the pattern of the embossing stamp had been transferred into the nanoparticle-functionalized coating.

The layers may now be cured thermally at temperatures from 100 to 800° C. A preferred heating rate is 3 K/min, with a holding time of 1 h at 500° C. The final thickness of the layer is 2.5 μm.

Then, a high-grade steel layer is applied by a sputtering process in a thickness of at least 100 nm.

The invention permits to produce mechanically and thermally resistant coatings with an appearance of stainless steel on a glass substrate, in particular in a very simple manner.

Example 3

In a vessel, 0.08 mol of GPTES (glycidyloxypropyltriethoxysilane) is provided with 4.1 g (0.02 mol) of TEOS (tetraethoxysilane) and is hydrolyzed with 2.3 g of water in which 0.344 g of PTSA (p-toluenesulfonic acid) had been dissolved.

After having been stirred for 2 min, 50 g of a 30 mass-% alcoholic dispersion of fibrous shaped $SiO_2$ nanoparticles with a diameter from 10 nm to 20 nm and a length from 40 nm to 150 nm in isopropanol is added to this hydrolyzate.

20 g of tripropylene glycol monomethyl ether is added to this solution, and the highly volatile solvent is removed in a rotary evaporator at 100 mbar and 50° C. bath temperature.

Then, 1.0 g of the cationic photoinitiator Irgacure 250 in 1 g of ethylene glycol monoethyl ether is added to the embossing sol.

This lacquer system allows to apply patterned layers to one side of transparent glass ceramics by screen printing using a 140 mesh. In addition to entirely patterned areas, areas with pattern elements having line widths of 0.5 mm, 1 mm, 10 mm are realized.

After the solvent had been dried off using IR radiation, a patterned silicone embossing stamp (PDMS) is applied, and then curing is accomplished through the embossing stamp using a UV lamp. When the embossing stamp is removed the pattern of the embossing stamp had been transferred into the nanoparticle-functionalized coating.

The layers are now thermally cured for 4 min at a temperature of 700° C. The mean final thickness of the layer is 3 μm.

Subsequently, a black luster color is applied by a screen printing technique using a 140 mesh, in a thickness of at least 50 nm.

Then, yet another protective layer based on a pigmented methylpolysiloxane resin dissolved in carbitol acetate is applied as an anti-scratch layer by screen printing. This layer is cured at 230° C. for 1 h.

The invention permits to produce mechanically and thermally resistant coatings with a brushed metallic appearance on a glass substrate, in particular in a very simple manner.

The invention claimed is:

1. A method for producing a glass or glass ceramic composite material with a metallic decorative appearance, comprising the steps of:
    applying a layer onto a glass or glass ceramic substrate, the layer comprising a photoinitiator and at least one of a sol-gel and a polysiloxane;
    patterning the layer using an embossing stamp or roller, wherein the layer is precured with ultraviolet radiation during the patterning using the embossing stamp or roller; and
    applying a metallic-looking layer onto the patterned layer.

2. The method as claimed in claim 1, wherein applying the metallic-looking layer comprises depositing a decorative layer using a process selected from the group consisting of a liquid phase coating, PVD process, and a CVD process.

3. The method as claimed in claim 1, wherein the layer comprises a sol-gel.

4. The method as claimed in claim 3, further comprising adding nanoparticles to the sol of the sol-gel.

5. The method as claimed in claim 4, further comprising adding the nanoparticles at a volume fraction of particles to the sol from 0.1 to 0.9.

6. The method as claimed in claim 5, wherein the volume fraction is from 0.5 to 0.8.

7. The method as claimed in claim 3, further comprising thermally curing the sol-gel layer between 50° C. and 1000° C.

8. The method as claimed in claim 3, further comprising thermally curing the sol-gel layer 450° C. and 740° C.

9. The method as claimed in claim 1, wherein the embossing stamp or roller has a pattern similar to a brushed metal surface.

10. The method as claimed in claim 3, further comprising screen printing the layer onto the substrate.

11. The method as claimed in claim 10, further comprising excluding at least one area of the substrate from being printed with the layer.

12. The method as claimed in claim 1, wherein the layer has a refractive index that differs from a refractive index of the substrate by less than 0.3.

13. The method as claimed in claim 1, further comprising applying the metallic-looking layer onto the layer in areas where the layer was not patterned.

\* \* \* \* \*